(12) United States Patent
Balasubrahmanian et al.

(10) Patent No.: US 11,132,368 B2
(45) Date of Patent: Sep. 28, 2021

(54) RECURSIVE DATA TRAVERSAL MODEL

(71) Applicant: Oracle International Corporation, Redwood Shores, CA (US)

(72) Inventors: Kaarthik Balasubrahmanian, Belmont, CA (US); Donald Creig Humes, Yorktown, VA (US); Sridhar Tadepalli, Bangalore (IN); Rajesh Ashwinbhai Shah, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 16/282,178

(22) Filed: Feb. 21, 2019

(65) Prior Publication Data

US 2020/0272629 A1 Aug. 27, 2020

(51) Int. Cl.
*G06F 16/245* (2019.01)
*G06F 16/23* (2019.01)
*G06F 16/2455* (2019.01)

(52) U.S. Cl.
CPC .... *G06F 16/24566* (2019.01); *G06F 16/2372* (2019.01)

(58) Field of Classification Search
CPC ................ G06F 16/24566; G06F 16/2372
USPC ......................................................... 707/609
See application file for complete search history.

(56) References Cited

U.S. PATENT DOCUMENTS

| | | | |
|---|---|---|---|
| 6,728,726 B1 * | 4/2004 | Bernstein | G06F 16/289 |
| 7,062,756 B2 * | 6/2006 | Kamen | H04L 29/06 |
| | | | 717/127 |
| 7,165,075 B2 * | 1/2007 | Harter | G06F 16/24539 |
| | | | 707/792 |
| 7,493,318 B2 * | 2/2009 | Komatsu | G06F 16/2438 |
| 8,386,532 B2 * | 2/2013 | Annapragada | G06F 16/27 |
| | | | 707/802 |
| 2008/0228697 A1 * | 9/2008 | Adya | G06F 16/212 |
| 2016/0350305 A1 * | 12/2016 | Shen | G06F 16/172 |

\* cited by examiner

*Primary Examiner* — Mohsen Almani
(74) *Attorney, Agent, or Firm* — Invoke

(57) ABSTRACT

One or more embodiments interpret a configuration graph to efficiently and optimally construct requests and fetch data from a datastore. The values of objects of a requested data type are used to generate additional queries for pre-fetching data from the datastore. Specifically, the values are used to query for and retrieve a corresponding subset of objects of another, related data type. Recursively querying for and retrieving objects of related data types based on already retrieved objects builds a data cache of relevant objects. The cached, relevant objects may be useful in subsequent queries that are likely to follow the initial query.

18 Claims, 9 Drawing Sheets

RECURSIVE DATA TRAVERSAL MODEL

TECHNICAL FIELD

The present disclosure relates to a recursive data traversal model. In particular, the present disclosure relates to a recursive data traversal model that implements a data retrieval relationship.

BACKGROUND

A client device may receive updates from or submit updates to a backend server. The updates, received or submitted by a client device, include updates to data.

Client devices may be operated in an online mode and an offline mode. An online mode is a mode in which a client device may communicate with a backend server via a network. An offline mode is a mode in which the client device is unable to communicate with a backend server via a network. When operating in an online mode, a client device may receive updates from and submit updates to a backend sever. When operating in an offline mode, a client device is unable to receive updates from or submit updates to a backend server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

One or more embodiments interpret a configuration graph to efficiently and optimally construct requests and fetch data from a datastore. The values of objects of a requested data type are used to generate additional queries for pre-fetching data from the datastore. Specifically, the values are used to query for and retrieve a corresponding subset of objects of another, related data type. Recursively querying for and retrieving objects of related data types based on already retrieved objects builds a data cache of relevant objects. The cached, relevant objects may be useful in subsequent queries that are likely to follow the initial query.

This Specification may include, and the claims may recite, some embodiments beyond those that are described in this General Overview section.

2. ARCHITECTURAL OVERVIEW

Figure 1:
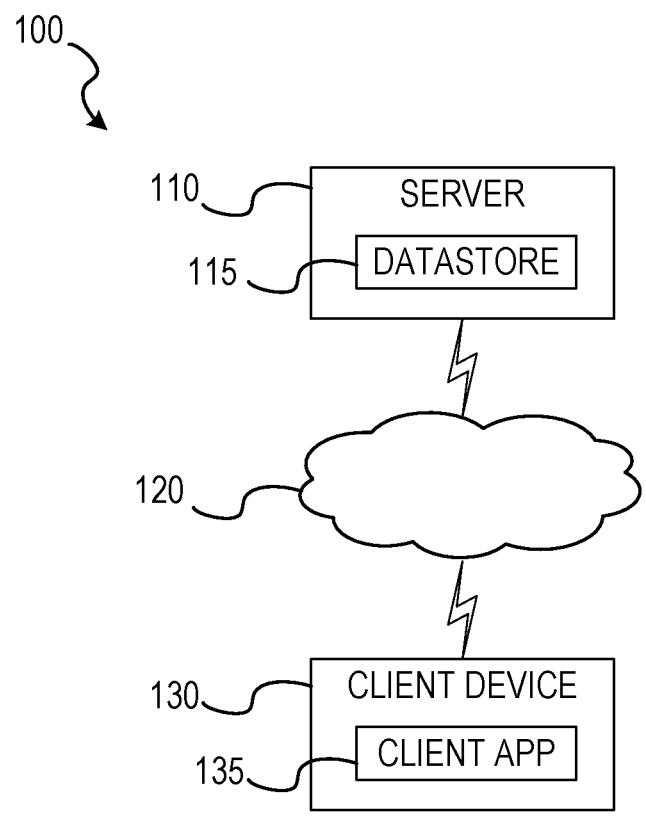
FIG. 1 shows a block diagram that illustrates a client-server computing system that operates over a network in accordance with one or more embodiments.

FIG. 1 shows a block diagram that illustrates a client-server computing system 100 that operates over a network 120 in accordance with one or more embodiments. The client-server computing system 100 may include a server 110 and a client device 130 communicatively coupled via the network 120. Each of the server 110 and the client device 130 may include a computing processor and associated memory and communications circuitry.

The network 120 may include a local area network (LAN), wide area network (WAN), Ethernet network, Token Ring network, asynchronous transfer mode (ATM) network, Wi-Fi network, the Internet, cellular telephone network, Enhanced Data rates for GSM Evolution (EDGE) network, long-term evolution (LTE) network, Worldwide Interoperability for Microwave Access (WiMAX) network, or other computing communications networks. The server 110 may include a datastore 115 that stores data accessible by the client device 130 via the network 120. The client device 130 may include a client application 135 (e.g., software application) that receives data from or accesses data stored in the datastore 115.

In an embodiment, the client device 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and a client device.

In one or more embodiments, the datastore 115 is any type of storage unit and/or device (e.g., a file system, database, collection of tables, or any other storage mechanism) for storing data. Further, the datastore 115 may include multiple different storage units and/or devices. The multiple different storage units and/or devices may or may not be of the same type or located at the same physical site. Alternatively or additionally, the datastore 115 may be implemented or executed on a computing system separate from the server 110. The datastore 115 may be communicatively coupled to the server 110 or the client device 130 via a direct connection or via the network 120.

The client application 135 may access data objects stored in the datastore 115 using a set of hypertext transfer protocol (HTTP) uniform resource identifiers (URIs), e.g., uniform resource locators (URL) used in conjunction with an HTTP request. HTTP may be used as a request-response protocol between the client device 130 and the server 110 to facilitate the transfer and management of data between the client application 135 and the datastore 115.

The server 110 may provide a representational state transfer (REST) service for servicing REST requests received from the client application 135. A REST request is a type of stateless HTTP request and may be transmitted to the server 110 by the client device 130. REST requests are subsets of HTTP requests. The REST request may use a set of uniform and predefined stateless operations. State may not be kept from request to request when the REST request is used. The server 110 may provide a description of the server 110 to the client application 135 as a REST server through a well-defined URL. Through this well-defined URL, the server 110 may provide a mechanism for the client application 135 to efficiently retrieve data from and upload data to the datastore 115.

In one or more embodiments, a user interface refers to hardware and/or software configured to facilitate communications between a user and the client device 130. The user interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface is specified in one or more other languages, such as Java, C, or C++.

In one or more embodiments, the client-server computing system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. AN ADAPTIVE POLYMORPHIC DATA MODEL

Figure 2:
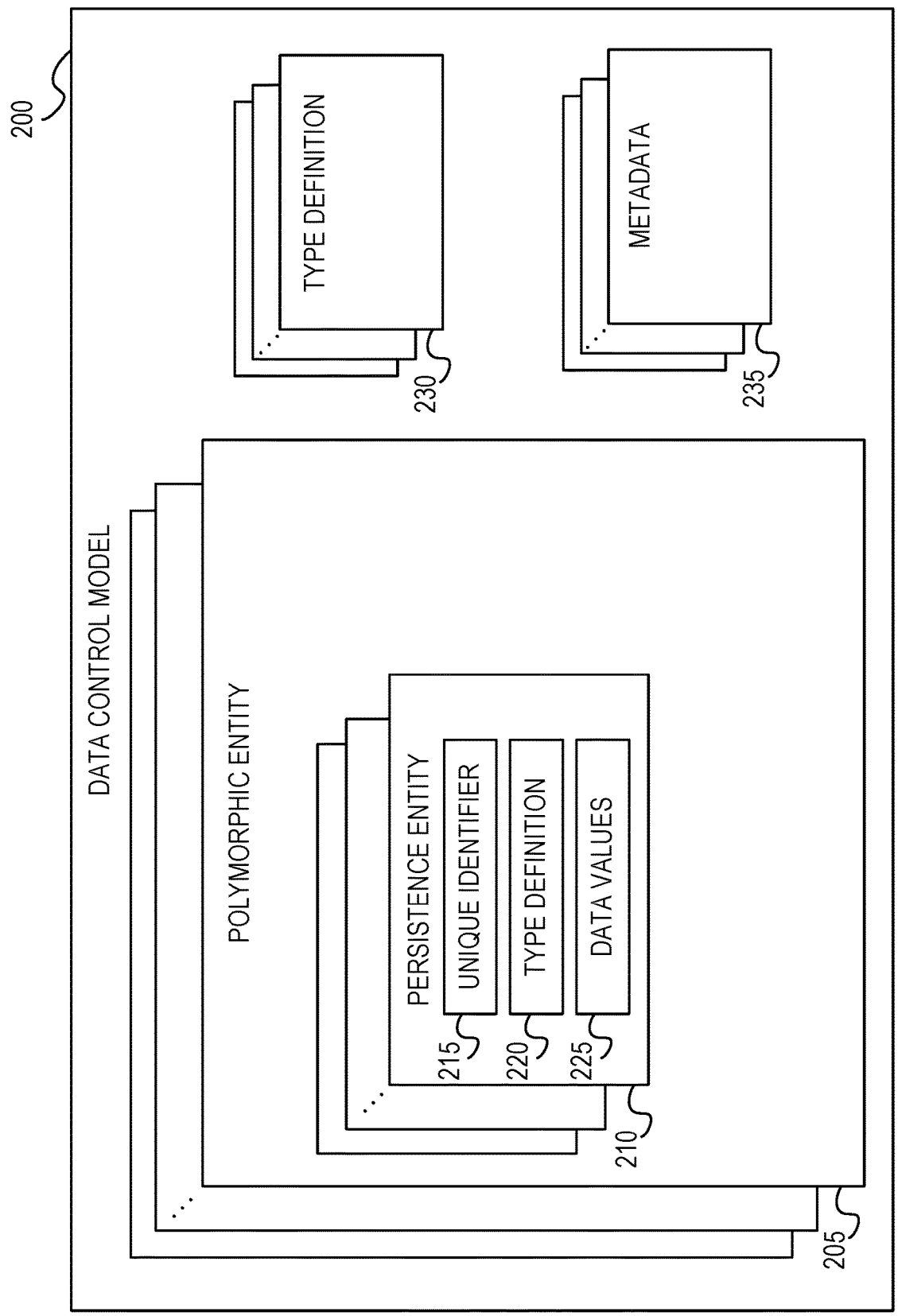
FIG. 2 shows a block diagram that illustrates components of a data control model in accordance with one or more embodiments.

FIG. 2 shows a block diagram that illustrates components of a data control model 200 in accordance with one or more embodiments. The data control model 200 may be an embodiment of an adaptive polymorphic data model. The data control model 200 may describe a database schema used by the client application 135. The server 110 may provide elements of the data control model 200 to the client application 135 from the datastore 115. The functionality and/or features of the client application 135 may be controlled as a function of the data control model 200. Thus, the client application 135 may provide different functionalities when provided with different elements of the data control model 200. Updates to the data control model 200 may be used to update the client application 135's functionality without updating the client application 135's executable code. Thus, new functionality may be added to the existing client application 135 by transmitting new elements of the data control model 200 to the existing client application 135 from the server 110.

In an example, a single client application 135 may be made available to any customer of a software provider via a central application download portal on a network. Each customer of the software provider may desire different functionality for the customer's respective client application 135 than the other customers. Rather than providing a different executable client application 135 to each different customer, the software provider may provide a same executable client application 135 to all customers. The software provider may also provide a different data control model 200 to each customer to be downloaded from each customer's respective server 110 to each respective customer's client applications 135.

For example, Company A may have a dedicated instance of the server 110 that only employees of Company A have access to via a set of client devices 130 that are issued to the employees of Company A by Company A. All of the client devices 130 used by employees of Company A may download the client application 135 from a publicly available application portal. In addition, Company B may have a dedicated instance of the server 110 that only employees of Company B have access to. The employees of Company B may access the server 110 via a set of client devices 130 that are issued by Company B to the employees of Company B. All of the client devices 130 used by employees of Company B may download the client application 135 from the same publicly available application portal as the employees of Company A. Company A's instance of the server 110 may download a data control model 200 customized for Company A to the client applications 135 on Company A's client devices 130. Company B's instance of the server 110 may download a data control model 200 customized for Company B to the client applications 135 on Company B's client devices 130. As a result, the client applications 135 for Company A's employees may provide different functionality than the client applications 135 for Company B's employees, even though the executable client application 135 downloaded from the publicly available application portal is the same for all of Company A's and all of Company B's client devices 130.

The data control model 200 may include one or more object type definitions 230. Each object type definition 230 may define an object type. The object type definition 230 may specify attributes of the object type. Examples of attributes may include sales order, delivery date, quantity, revenue, etc. The object type definition 230 may also specify the data format of an attribute, e.g., text string, length of text string, character, integer, signed integer, unsigned integer, floating point, double precision floating point, character or integer array, array dimensions, etc. The object type definition 230 may also specify default values for each attribute of the object type. The object type definition 230 may also specify which fields are mandatory for inclusion in each view of the defined object type, and which are mandatory for inclusion in a full canonical view of the defined object type. For example, a delivery date may be a mandatory field for a sales order data object type. The object type definition 230 may also specify which fields may be changed by the client application 135 and which fields may not be changed. For example, revenue may be a field for a sales order data object type that cannot be changed by the client application 135. The object type definition 230 may also specify the functions that the client application 135 is to use to communicate with the server 110 with regard to the object type. Examples of such functions may include fetch, update, delete, etc. The functions specified in the object type definition 230 include information to be used by the client application 135 to build URL's for communicating with the server 110 regarding the object defined by the respective object type definition 230. Such communications may include transmitting values of data fields of an object to the datastore 115 and updating a value of a data field of an object at the datastore 115. A URL may be specified to update the value of a data field of the object at the datastore 115.

The data control model 200 may also include one or more metadata modules 235. The metadata modules 235 may be embodied as data files or data objects. Each metadata module 235 may identify fields of an object type defined by the respective object type definition 230. For example, numerous different metadata modules 235 may identify a different set of fields of a same object type defined by the respective object type definition 230. Each of the different metadata modules 235 that correspond to the same object may define a different view or shape of the object type. The server 110 may store a complete or full canonical representation of the object type in the datastore 115. The client application 135 may download different subsets of the full set of fields of the object type stored in the datastore 115 to work with according to the metadata modules 235. Downloading a partial object from the datastore 115 may provide a savings in communications bandwidth over the network 120 and a savings in memory usage in the client device 130. The alternative of downloading the full canonical representation of the object type each time the object type is operated upon, regardless of what portions of the object type are to be operated upon, may be inefficient.

As an example, the client application 135 may use a metadata module 235 that represents a small subset of the fields of a data object type in order to download a list of data objects from the datastore 115. The client application 135 may use an HTTP request sent from the client device 130 to the server 110 to access the list of data objects in the datastore 115 that have a field value for a given field that matches a search parameter specified by the client application 135. The client application 135 may specify an object sub-type defined in the metadata module 235 so that the desired subsets of the fields of the data objects are downloaded, and not the complete or full canonical representations of the data objects. Thus, the sub-types defined in the metadata module 235 facilitate the client application 135 downloading a partial object from the datastore 115 rather than the full canonical object.

For example, a data object type may be a sales order. The client application 135 may download a list of sales orders for a specified customer, or a specified sales person, or a specified period of time, etc. The client application 135 may present the list of sales orders in a user interface. A user may select one or more of the presented lists of sales orders to see more data regarding the sales orders or to perform operations upon the sales orders. In response to the user selection, the client application 135 may use a different metadata module 235 that represents a larger subset of the fields of the sales order data object type to download additional details regarding the selected one or more of the presented lists of sales orders. The sales order data object type defined in a respective object type definition 230 may have a number of different associated metadata modules 235. Each of the metadata modules 235 may represent a different level of detail of the sales order data object type. The levels of detail may range from a minimal list view to a full canonical view that includes all the data fields of the sales order data object type.

In addition to specifying different views of objects defined in the object type definitions 230, the metadata modules 235 may also specify how the objects behave, interact with one another, interact with a user interface of the client application 135, and interact with the server 110. The metadata modules 235 may specify a layout of an object and offsets associated with each field of an object.

The data control model 200 may include one or more polymorphic entities 205. Each polymorphic entity 205 may define a different overall functionality for the data control model 200. When the client application 135 operates according to one polymorphic entity 205, the client application 135 may provide different features or functionality than when the client application 135 operates according to a different polymorphic entity 205.

Each polymorphic entity 205 may include one or more persistence entities 210. The persistence entities 210 of one instance of the polymorphic entity 205 may be different than the persistence entities 210 of a different instance of the polymorphic entity 205. Each instance of a persistence entity 210 may represent an instance of a data object as defined in a corresponding object type definition 230.

The persistence entity 210 may be an abstract representation of a data object. The persistence entity 210 may include a unique identifier 215 that uniquely identifies each instance of the persistence entity 210 within a specific polymorphic entity 205. The persistence entity 210 may also include an object type definition 220 that defines the object type represented by the persistence entity 210. The object type definition 220 may be an embodiment of a corresponding object type definition 230. The persistence entity 210 may also include a plurality of data values 225, each of which may be associated with a data field name as defined in the object type definition 220.

The persistence entity 210 may include functions defined by the object type definition 220 that operate on the data values 225 and interact with the datastore 115 with reference to a data object type as defined by the object type definition 220. Executable code included in the client application 135 that implements the persistence entity 210 may have no built-in information regarding the data objects represented by the object type definition 220. The executable code included in the client application 135 may provide functionality according to data included in the object type definition 220. In an embodiment, the persistence entity 210 may be implemented by Java code in the client application 135, and the object type definition 220 may be specified according to a JavaScript Object Notation (JSON) representation provided by the datastore 115. In various embodiments, other programming languages and database formats may be used to implement the persistence entities 210 in the client application 135. The Java code for the persistence entity 210 may be provided with the client application 135 at design time, while the JSON representation of the object type definition 220 may be provided via the datastore 115 at run time.

For example, an instance of a persistence entity 210 may be an object that is an instance of a sales order datatype that is defined according to a class that includes methods for operating on the sales order datatype. The class may be defined by the object type definition 230. According to the class definition, the persistence entity 210 may be able to build HTTP requests as appropriate to work with sales order data objects stored in the datastore 115, including fetching the sales order data objects, updating the sales order data objects, etc. Functions provided by the persistence entity 210 that operate on data objects stored in the datastore 115 may be defined generally to operate upon any type of data objects stored in the datastore 115. The functions provided by the persistence entity 210 may be called by methods provided in the class by which the persistence entity 210 is defined according to the object type definition 220. For example, rather than a hardcoded function named GetRevenue(<object identifier>) that is defined to only operate on a Revenue object, the executable code of the client application 135 may include a hardcoded function named Get( ) that may be called by a method of the class corresponding to a sales order data type persistence entity 210 on a field named Revenue as Get(Revenue, <object identifier>), where <object identifier> is the unique identifier 215 of the corresponding persistence entity 210.

In an example, when the client application 135 fetches a list of sales order data objects from the datastore 115, each sales order object returned may be represented by a separately defined instance of the persistence entity 210. The sales order data objects returned in the list may be represented as sub-types of the full canonical sales order data type stored in the datastore 115 according to a metadata module 235 corresponding to a list of the sales order data object type. A user may select one of the sales order data objects in the list to request the associated Revenue field value. The Revenue field may not be included in the sub-type of the sales order data type according to the metadata module 235 corresponding to the list. A Get(Revenue, <identifier>) function may be executed by the persistence entity 210 corresponding to the selected sales order data object. The Get function may look up the Revenue field in the persistence entity's object type definition 220 to determine what kind of data the Revenue field contains and look up the value for the field in the data values 225. If the value is not included in the data values 225, the Get function may issue an HTTP request to the datastore 115 according to a metadata module 235 that includes the field Revenue for the sales order data object type. After receiving the Revenue data field, and any other data fields defined by the metadata module 235 used by the Get function, the Get function may perform processing on the Revenue data value according to the class definition of the method corresponding to the Get function as specified by the object type definition 220. The persistence entity 210 may then present the Revenue data value returned by the Get function to the user via a user interface of the client application 135.

Each customer of the software provider may desire different functionality for the customer's respective client application 135 than the other customers. Rather than providing a different executable client application 135 to each different customer, the software provider may provide a same executable client application 135 to all customers. The software provider may also provide a different data control model 200 to each customer to be downloaded from each customer's respective server 110 to each respective customer's client applications 135.

In an embodiment, a particular customer of a software provider that provides the client application 135 to the particular customer may desire to update the functionality of the client application 135 used by the particular customer or under the particular customer's control. The updated functionality may include new data object type definitions 230 (e.g., for a new regional warehouse data object), new metadata modules 235, updates to either or both of existing data object type definitions 230 and metadata modules 235, etc. The particular customer may use a software tool to update the data control model 200 at the particular customer's server 110. The particular customer may transmit the updated data control model 200 to the particular customer's one or more instances of the particular customer's client application 135 on various client devices 130 under the particular customer's control. The particular customer's update of the particular customer's client application 135 on various client devices 130 under the particular customer's control may not affect instances of the client application 135 provided by the software provider to other customers of the software provider. All customers of the software provider may install and use a same executable client application 135. The particular customer may update the data control model 200 used by the particular customer's instances of the client application 135 without affecting any other instances of the client application 135.

In an embodiment, a salesperson may use the client application 135 to display a list of sales opportunities. Each of the sales opportunities may be represented by an object type Opportunities in the data control model 200 of the client application 135. In response to a request from the salesperson, the client application 135 may display a list of values of data fields from the Opportunities objects that meet the salesperson's criteria. The client application 135 may determine, based on the configuration of the client application 135, that only the customer name and the customer phone number are displayed in a list view of opportunities. The client application 135 may analyze a metadata module 235 corresponding to the object type Opportunity. The client application 135 may determine that the metadata module 235 corresponding to the object type Opportunity includes the to-be-displayed fields, customer name and customer phone number. The client application 135 may retrieve values for fields identified in the corresponding metadata module 235 from the datastore 115. As the fields to-be-displayed are included in the corresponding metadata module 235, the client application 135 may retrieve values for the customer name and the customer phone number from objects of type Opportunity stored in the datastore 115. The client application 135 may display, in a list view, the retrieved information for different opportunities.

In addition to storing the values for customer name and customer number, the datastore 115 may also store values for a field customer budget in the object type Opportunity.

However, the client application 135 may not obtain a copy of the values corresponding to customer budget as customer budget is not identified in corresponding metadata module 235 used by the client application 135.

In an embodiment, the client application 135 may receive a user request for a value of a field of an object that is not included in the corresponding metadata module 235. The client application 135 may search the metadata modules 235 for another corresponding metadata module 235 that does include the requested field for the specified object type. The client application 135 may then download the object from the datastore 115 according to the other corresponding metadata module 235 that does include the requested field. The client application 135 may modify the locally stored partial copy of the object, previously retrieved from the server, to include the fields and values obtained from the datastore 115 corresponding to the other corresponding metadata module 235 that does include the requested field for the specified object type.

Continuing the above example, the client application 135 may receive a selection of a particular opportunity from the salesman when the client application 135 is displaying opportunities in the list view. The client application 135 may be configured to show a detailed view of an opportunity in response to receiving a selection of that opportunity. The client application 135 may determine that the detailed view of an opportunity includes a customer name, a customer phone number, and a customer budget. The client application 135, based on an analysis of the corresponding metadata module 235, may determine that the corresponding metadata module 235 identifies the fields customer name and customer phone number. The client application 135 may further determine that the corresponding metadata module 235 does not identify the field customer budget. Since the corresponding metadata module 235 does not identify the field customer budget, any version of an object, corresponding to the particular opportunity, which is stored by the client application according to the corresponding metadata module 235 may be determined to not include values for the field customer budget. The client application 135 may identify a different metadata module 235 in the data control model 200 corresponding to the object type Opportunity that does include the desired field customer budget. The client application 135 may then request, from the datastore 115 on the server 110, values corresponding to the fields identified in the different metadata module 235 that does include the field customer budget. Specifically, the client application 135 may request the object of type Opportunity which corresponds to the particular opportunity selected by the salesman. In response to transmitting the request, the client application 135 may receive an object of type Opportunity and corresponding to the particular opportunity selected by the salesman. The object may include values for customer name, customer number, and customer budget which are all now identified in the different metadata module 235 maintained by the client application 135 that is now selected to define the view of the particular object. Alternatively, the object received from the datastore 115 may not include values for the customer name and customer number if no change has been made to the values since the last time the values were received by the client application 135. The client application 135 may replace or overwrite any stored prior version of the object corresponding to the particular opportunity. The client application 135 may store a new version of the object, corresponding to the particular opportunity, and including customer name, customer phone number, and customer budget. The client application 135 may display a detailed view of the particular opportunity selected by the salesman. The detailed view, displayed by the client application 135, may include the customer name, the customer number, and the customer budget.

In an embodiment, an application on the server 110 may receive a request to create a new integer field of type Commission for an object of the type Opportunity stored in the datastore 115. The field type Commission may not currently be identified as a field in any object type definition 230 or metadata module 235 maintained by the client application 135 or maintained by the server 110. The server 110 may update the object type definition 230 corresponding to the object type Opportunity and one or more corresponding metadata modules 235 maintained by the client application 135. Specifically, the updates to the object type Opportunity and one or more corresponding metadata modules 235 include a new integer field of type Commission. The datastore 115 and the client application 135 may store values for the field of type Commission to reflect the addition of the new field of type Commission. The client application 135 may also retrieve and display values corresponding to the field Commission on a user interface.

In an embodiment, the server 110 may receive a request to generate a new type of an object that is different than the types of any objects stored in the datastore 115 and/or the client application 135. Responsive to the request to generate an object of a new type, the server 110 may (a) generate a new object type definition 230 and (b) generate one or more new metadata modules 235 corresponding to the new object type. The object type definition 230 may include one or more data fields to be included in the new type of object, and the one or more metadata modules 235 may specify different subsets of the one or more data fields to be included in the new type of object. The server 110 may synchronize the new object type definition 230 and the new one or more metadata modules 235 with the client application 135 by updating the data control model of the client application 135. Accordingly, the server 110 and the client application 135 may use the object type definitions 230 and the metadata modules 235 to define new object types. The server 110 may add a new object type to a collection of object types defined by the server 110 and used by the client application 135.

Continuing the above example, the server 110 may receive a request to create a new object of type NetworkingEvent. The request may further specify three fields Date, Time, and Location as fields of the object of the type NetworkingEvent. Neither the client application 135 nor the server 110 may include an object type definition 230 or metadata module 235 defining any object of type NetworkingEvent. Responsive to receiving the request, the server 110 may generate an object type definition 230 and one or more metadata modules 235 corresponding to the object type NetworkingEvent. The object type definition 230 and one or more metadata modules 235 corresponding to the object type NetworkingEvent may identify at least three fields Date, Time, and Location. The server 110 may transmit the object type definition 230 and one or more metadata modules 235 to the client application 135 to provide a definition the object type NetworkingEvent. The client application 135 may also generate objects of type NetworkingEvent and transmit the objects to the server 110 for synchronization.

4. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

4.1 Modifying a Polymorphic Data Model

Figure 3:
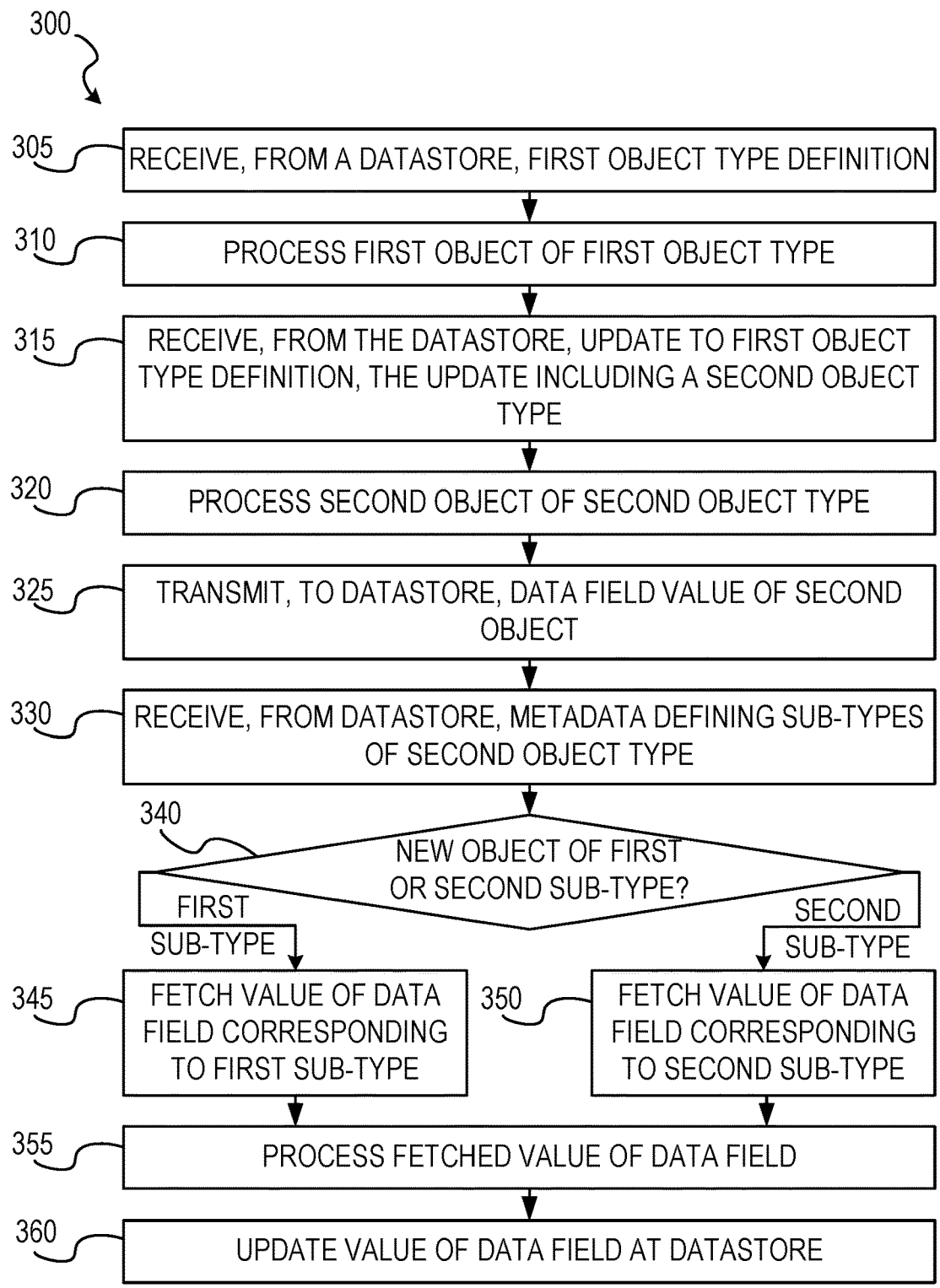
FIG. 3 shows a block diagram that illustrates an example set of operations for updating an object type definition in accordance with one or more embodiments.

FIG. 3 shows a block diagram that illustrates an example set of operations 300 for updating an object type definition in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an operation 305, a client application 135 may receive a first object type definition 230 from a datastore 115. The first object type definition 230 may be received by a client device 130 on which the client application 135 executes over a network 120 from a server 110 that hosts the datastore 115. The first object type definition 230 may define a first object type to be used in a data control model 200 that controls the functionality of the client application 135. The first object type definition 230 may define one or more data fields of the first object type. Each defined data field may include a data field name and a data field value. As an example, the object type may be an Opportunity, for example, a sales opportunity. The object type Opportunity may be defined by the first object type definition 230 to include numerous data fields, for example, a Customer Name field and a Customer Phone Number field.

In an operation 310, a first object of the first object type may be processed according to the received first object type definition 230. For example, the client application 135 may generate a persistence entity 210 to represent an instance of the first object according to the first object type definition 230. The generated persistence entity 210 may include a unique identifier 215 that uniquely identifies the first object within the polymorphic entity 205 that represents the schema used by the client application 135. The generated persistence entity 210 may also include an object type definition 220 based on a copy of the first object type definition 230 upon which the generated persistence entity 210 is based. The persistence entity 210 may also include one or more data fields having associated data values 225 according to the object type definition 220. As another example, a user interface of the client application 135 may display one or more data field values of the first object. The persistence entity 210 may also perform one or more methods associated with a class defined by the object type definition 220 to operate upon the first object represented by the persistence entity 210.

In an operation 315, the client application 135 may receive an update to the first object type definition 230 from the datastore 115. The update may include a second object type definition 230. The second object type definition 230 may define a second object type to be used in the data control model 200 that controls the functionality of the client application 135. The second object type definition 230 may define one or more data fields of the second object type. Each defined data field may include a data field name and a data field value. As an example, the object type may be a Warehouse. The object type Warehouse may be defined by the second object type definition 230 to include numerous data fields, for example, a Warehouse Address field and a Warehouse Phone Number field. As another example, the second object type definition 230 may be an updated version of the first object type definition 230 and replace the first object type definition 230 in the data control model 200 of the client application 135. The second object type definition 230 may be an Opportunity, for example, a sales opportunity. The updated second object type Opportunity may be defined by the second object type definition 230 to include numerous data fields, for example, a Customer Name field, a Customer Phone Number field, and Customer Budget field. In this example, the second object type definition 230 includes an additional data field and value that are not included in the first object type definition 230.

In an operation 320, a second object of the second object type may be processed according to the received second object type definition 230. For example, the client application 135 may generate a persistence entity 210 to represent an instance of the second object according to the second object type definition 230. The generated persistence entity 210 may include a unique identifier 215 that uniquely identifies the second object within the polymorphic entity 205 that represents the schema used by the client application 135. The generated persistence entity 210 may also include an object type definition 220 based on a copy of the second object type definition 230 upon which the generated persistence entity 210 is based. The persistence entity 210 may also include one or more data fields having associated data values 225 according to the object type definition 220. As another example, a user interface of the client application 135 may display one or more data field values of the second object. The persistence entity 210 may also perform one or more methods associated with a class defined by the object type definition 220 to operate upon the second object represented by the persistence entity 210. As another example, when the second object type definition 230 is an updated version of the first object type definition 230 and replaces the first object type definition 230 in the data control model 200 of the client application 135, the persistence entity 210 representing the first object of the first object type may be updated to include the object type definition 220 based on a copy of the second object type definition 230 and represent an instance of the second object of the second object type accordingly. The persistence entity 210 may also be updated to include one or more additional data fields having associated data values 225 according to the updated object type definition 220.

In an operation 325, the client application 135 may transmit a data field value of the second object to the datastore 115. For example, the client application 135 may transmit a value of the Warehouse Phone Number when the second object type is a Warehouse, and thereby update the Warehouse Phone Number stored for the Warehouse object in the datastore 115. As another example, the client application 135 may update the value of the Customer Budget stored in the Opportunity object in the datastore 115. The client application 135 may transmit a value of the Customer Budget when the second object type is an Opportunity with an updated list of data fields compared to the first object type.

In an operation 330, the client application 135 may receive one or more metadata modules 235 from the datastore 115. The metadata modules 235 may define sub-types of the second object type defined by the second object type definition 230. For example, a first metadata module 235 may define a full canonical sub-type of the Opportunity object type that includes the Customer Name field, the Customer Phone Number field, and the Customer Budget field. A second metadata module 235 may define a subset sub-type of the Opportunity object type that includes the Customer Name field and the Customer Phone Number field. A third metadata module 235 may define a list sub-type of the Opportunity object type that includes the Customer Name field only. A method for the Opportunity object type may download a list of Opportunity objects according to the list sub-type metadata module 235 to minimize data transmission overhead and data storage overhead in the client device 130. When only the Customer Name field is needed to be presented in the user interface of the client application 135, the full canonical representation of the Opportunity objects may not be needed, and the list sub-type may be more efficient. Another method for the Opportunity object type may download the full canonical representation of a selected Opportunity object according to the full canonical sub-type metadata module 235. When one Opportunity object in the list of Opportunity objects is selected for viewing and/or editing all the data fields of the selected Opportunity object, the full canonical representation of the Opportunity objects may be needed, and the list sub-type may be insufficient.

In an operation 340, the client application 135 may make a determination regarding whether a new object that is created according to the second object type definition 230 is a first sub-type, e.g., created according to the list sub-type of the Opportunity object type, or a second sub-type, e.g., created according to the full canonical sub-type of the Opportunity object type.

In an operation 345, if the new object is determined to correspond to the first sub-type of the second object type definition 230 in operation 340, the client application 135 may fetch a value of a data field corresponding to the first sub-type from the datastore 115. For example, when the first sub-type of the Opportunity object type is the list sub-type, the client application 135 may fetch a value of the Customer Name data field from the datastore 115.

In an operation 350, if the new object is determined to correspond to the second sub-type of the second object type definition 230 in operation 340, the client application 135 may fetch a value of a data field corresponding to the second sub-type from the datastore 115. For example, when the second sub-type of the Opportunity object type is the full canonical sub-type, the client application 135 may fetch a value of the Customer Budget data field from the datastore 115.

In an operation 355, the client application 135 may process the value of the data field fetched in either of operations 345 or 350. For example, the client application 135 may display the value of the fetched data field in the user interface of the client application 135. The client application 135 may perform a mathematical computation on the value of the fetched data field and display the results of the mathematical computation in the user interface of the client application 135.

In an operation 360, the client application 135 may cause a value of the data field processed in operation 355 to be updated at the datastore 115. The client application 135 may perform a method defined by the second object type definition 230 represented in the object type definition 220 of the persistence entity 210. The method performed may include transmitting an HTTP request to the datastore 115 to update the value of the data field fetched in one of operations 345 and 350 according to the results of the processing of the fetched value of the data field in operation 355.

Figure 4:
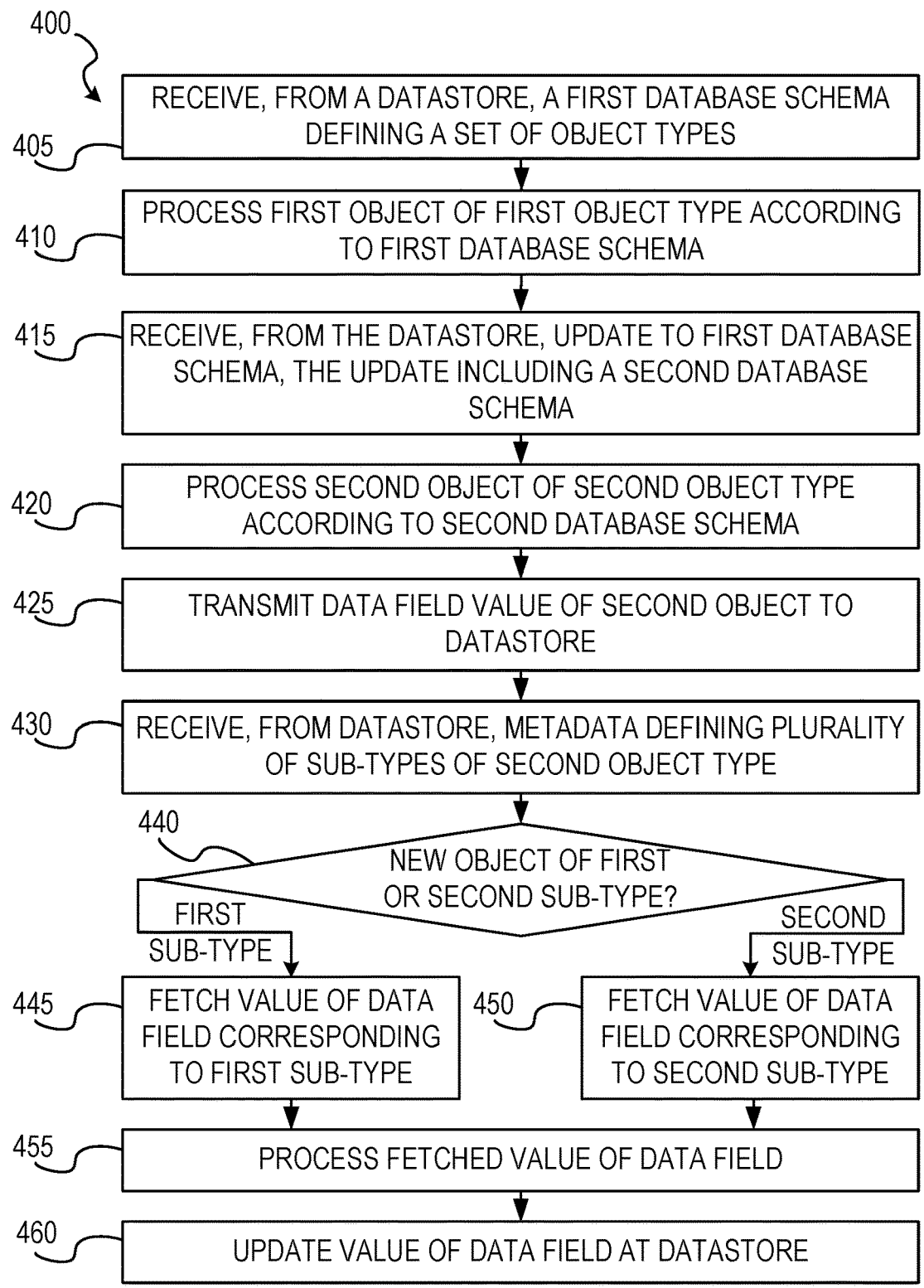
FIG. 4 shows a block diagram that illustrates an example set of operations for updating an object type definition in accordance with one or more embodiments.

FIG. 4 shows a block diagram that illustrates an example set of operations 400 for updating an object type definition in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an operation 405, a client application 135 may receive a first database schema, e.g., a data control model 200 that controls the functionality of the client application 135, from a datastore 115. The first database schema may be received by a client device 130 on which the client application 135 executes over a network 120 from a server 110 that hosts the datastore 115. The first database schema may include a first object type definition 230 that defines a first object type. The first object type definition 230 may define one or more data fields of the first object type. Each defined data field may include a data field name and a data field value. As an example, the object type may be an Opportunity, for example, a sales opportunity. The object type Opportunity may be defined by the first object type definition 230 to include numerous data fields, for example, a Customer Name field and a Customer Phone Number field. The first database schema may also include one or more metadata modules 235 that each define a view of the first object type defined by the first object type definition 230. Each of the one or more metadata modules 235 may specify a different subset of data fields included in the full canonical representation of the first object type to be included in the respective view. As an example, one view defined by one of the metadata modules 235 may specify only the Customer Name field be included from the various fields specified by the full canonical Opportunity object type. Another view defined by another of the metadata modules 235 may specify that both the Customer Name field and a Customer Phone Number field be included from the various fields specified by the full canonical Opportunity object type.

In an operation 410, a first object of the first object type may be processed according to the received first database schema. For example, the client application 135 may generate a persistence entity 210 to represent an instance of the first object according to the first object type definition 230. The generated persistence entity 210 may include a unique identifier 215 that uniquely identifies the first object within the polymorphic entity 205 that represents the first database schema used by the client application 135. The generated persistence entity 210 may also include an object type definition 220 based on a copy of the first object type definition 230 upon which the generated persistence entity 210 is based. The persistence entity 210 may also include one or more data fields having associated data values 225 according to the object type definition 220. As another example, a user interface of the client application 135 may display one or more data field values of the first object. The persistence entity 210 may also perform one or more methods associated with a class defined by the object type definition 220 to operate upon the first object represented by the persistence entity 210.

In an operation 415, the client application 135 may receive an update to the first database schema from the datastore 115. The update to the first database schema may include a second database schema different from the first database schema. The update may include a second object type definition 230. The second object type definition 230 may define a second object type to be used in the data control model 200 that controls the functionality of the client application 135. The second object type definition 230 may define one or more data fields of the second object type. Each defined data field may include a data field name and a data field value. As an example, the object type may be a Warehouse. The object type Warehouse may be defined by the second object type definition 230 to include numerous data fields, for example, a Warehouse Address field and a Warehouse Phone Number field. As another example, the second object type definition 230 may be an updated version of the first object type definition 230 and replace the first object type definition 230 in the data control model 200 of the client application 135. The second object type definition 230 may be an Opportunity, for example, a sales opportunity. The updated second object type Opportunity may be defined by the second object type definition 230 to include numerous data fields, for example, a Customer Name field, a Customer Phone Number field, and Customer Budget field. In this example, the second object type definition 230 includes an additional data field and value that are not included in the first object type definition 230.

In an operation 420, a second object of the second object type may be processed according to the received second database schema. For example, the client application 135 may generate a persistence entity 210 to represent an instance of the second object according to the second object type definition 230. The generated persistence entity 210 may include a unique identifier 215 that uniquely identifies the second object within the polymorphic entity 205 that represents the schema used by the client application 135. The generated persistence entity 210 may also include an object type definition 220 based on a copy of the second object type definition 230 upon which the generated persistence entity 210 is based. The persistence entity 210 may also include one or more data fields having associated data values 225 according to the object type definition 220. As another example, a user interface of the client application 135 may display one or more data field values of the second object. The persistence entity 210 may also perform one or more methods associated with a class defined by the object type definition 220 to operate upon the second object represented by the persistence entity 210. As another example, when the second object type definition 230 is an updated version of the first object type definition 230 and replaces the first object type definition 230 in the data control model 200 of the client application 135, the persistence entity 210 representing the first object of the first object type may be updated to include the object type definition 220 based on a copy of the second object type definition 230 and represent an instance of the second object of the second object type accordingly. The persistence entity 210 may also be updated to include one or more additional data fields having associated data values 225 according to the updated object type definition 220.

In an operation 425, the client application 135 may transmit a data field value of the second object to the datastore 115. For example, the client application 135 may transmit a value of the Warehouse Phone Number when the second object type is a Warehouse, and thereby update the Warehouse Phone Number stored for the Warehouse object in the datastore 115. As another example, the client application 135 may transmit a value of the Customer Budget when the second object type is an Opportunity with an updated list of data fields compared to the first object type, and thereby update the value of the Customer Budget stored in the Opportunity object in the datastore 115.

In an operation 430, the client application 135 may receive one or more metadata modules 235 from the datastore 115. The metadata modules 235 may define sub-types of the second object type defined by the second object type definition 230. For example, a first metadata module 235 may define a full canonical sub-type of the Opportunity object type that includes the Customer Name field, the Customer Phone Number field, and the Customer Budget field. A second metadata module 235 may define a subset sub-type of the Opportunity object type that includes the Customer Name field and the Customer Phone Number field. A third metadata module 235 may define a list sub-type of the Opportunity object type that includes the Customer Name field only. A method for the Opportunity object type may download a list of Opportunity objects according to the list sub-type metadata module 235 to minimize data transmission overhead and data storage overhead in the client device 130 when only the Customer Name field is needed to be presented in the user interface of the client application 135. Another method for the Opportunity object type may download the full canonical representation of a selected Opportunity object according to the full canonical sub-type metadata module 235 when one Opportunity object in the list of Opportunity objects is selected for viewing and/or editing all the data fields of the selected Opportunity object.

In an operation 440, the client application 135 may make a determination regarding whether a new object that is created according to the second object type definition 230 is a first sub-type, e.g., created according to the list sub-type of the Opportunity object type, or a second sub-type, e.g., created according to the full canonical sub-type of the Opportunity object type.

In an operation 445, if the new object is determined to correspond to the first sub-type of the second object type definition 230 in operation 440, the client application 135 may fetch a value of a data field corresponding to the first sub-type from the datastore 115. For example, when the first sub-type of the Opportunity object type is the list sub-type, the client application 135 may fetch a value of the Customer Name data field from the datastore 115.

In an operation 450, if the new object is determined to correspond to the second sub-type of the second object type definition 230 in operation 440, the client application 135 may fetch a value of a data field corresponding to the second sub-type from the datastore 115. For example, when the second sub-type of the Opportunity object type is the full canonical sub-type, the client application 135 may fetch a value of the Customer Budget data field from the datastore 115.

In an operation 455, the client application 135 may process the value of the data field fetched in either of operations 445 or 450. For example, the client application 135 may display the value of the fetched data field in the user interface of the client application 135, or the client application 135 may perform a mathematical computation on the value of the fetched data field and display the results of the mathematical computation in the user interface of the client application 135.

In an operation 460, the client application 135 may cause a value of the data field processed in operation 455 to be updated at the datastore 115. The client application 135 may perform a method defined by the second object type definition 230 represented in the object type definition 220 of the persistence entity 210. The method performed may include transmitting an HTTP request to the datastore 115 to update the value of the data field fetched in one of operations 445 and 450 according to the results of the processing of the fetched value of the data field in operation 455.

4.2 Recursive Data Traversal Model

It is often desirable that application data and features for the client application 135 be configurable on the fly for various business purposes and enhancing of user experiences. Runtime extensibility capabilities may facilitate the application data and features to be seamlessly configurable via the client device 130 or the server 110. In addition, offline access may facilitate application data and features to be available in the client application 135 when the client device 130 cannot connect to the server 110 via the network 120. If a user attempts to define flows to access application data or functionality in the client application 135 at runtime, and a corresponding design time entity is unavailable on the client device 130, the user's usage of the client application 135 may be limited.

One example may be when customers of a client application 135 across different industries request detailed information about configurations specific to their different business workflows by means of a synchronization process. An embodiment addresses this issue using an object agnostic data traversal model as part of a definition file for the client application 135. The object agnostic data traversal model may feature polymorphic behavior that facilitates alteration at runtime to work with changes to definitions of the client application 135 on the fly. An embodiment of this object agnostic data traversal model facilitates the client application 135 to interpret in real time a graph configuration that may change at runtime to request data from a datastore 115 hosted on a server 110 through the means of traversal and provide access to application data and features defined at either design time or runtime while connected or disconnected to the datastore 115 hosted on the server 110, seamlessly.

The client application 135 may include, interpret, and use a graph configuration model to access application data and features defined either at design time or at runtime. The graph configuration model may be object agnostic and include unique identifiers specified on the entities defined. These unique identifiers may be used in conjunction with metadata properties defined on the entities to issue subsequent requests. Each feature may be persisted as an abstract object definition under an identifier and may be subsequently retrieved when an action is invoked that specifies a matching unique identifier. A data retrieval relationship between different entities in the graph configuration model may be specified in metadata properties according to the unique identifiers of the corresponding entities. The data retrieval relationship may be a mapping that statically links different object types represented by the corresponding entities. The data retrieval relationship may effectively be any mapping used by the client application 135 to determine which records are to be retrieved based on a first object type. The data retrieval relationship may identify a second object type as a function of a first object type. The client application 135 may then retrieve records of this second object type from a datastore 115 on a server 110. Multiple modes of cached data retrieval may be supported either using a URI or runtime indices.

The client application 135 may interpret in real time a configuration graph that may change at runtime to request data from a datastore 115. The configuration graph may facilitate the client application 135 to efficiently and optimally construct requests to fetch data from the datastore 115. The configuration graph may be segmented into metadata that adheres to a standard schema and may be stored in memory as a collection of abstract entities identified by a unique qualifier defined on the abstract entities. The qualifier in conjunction with properties defined on the entities may be used to request information. The request for data may be through the recursive data traversal and provide access to data and features defined either at design time for the client application 135 or runtime of the client application 135 while connected to or disconnected from the datastore 115. Data may be cached on the client device 130 prior to user access, thereby optimizing the user experience in real time.

A response to the request may be received and persisted in data storage on the client device 130.

The client application 135 may interpret and use the graph configuration model to access data for features defined either at design time or at runtime of the client application 135. Unique identifiers specified for the entities defined by the object agnostic model may be used in conjunction with metadata properties defined on the entities to issue subsequent requests. Each feature may be persisted as an abstract object definition under an identifier and be subsequently retrieved when an action is invoked that specifies a matching unique identifier.

Figure 5:
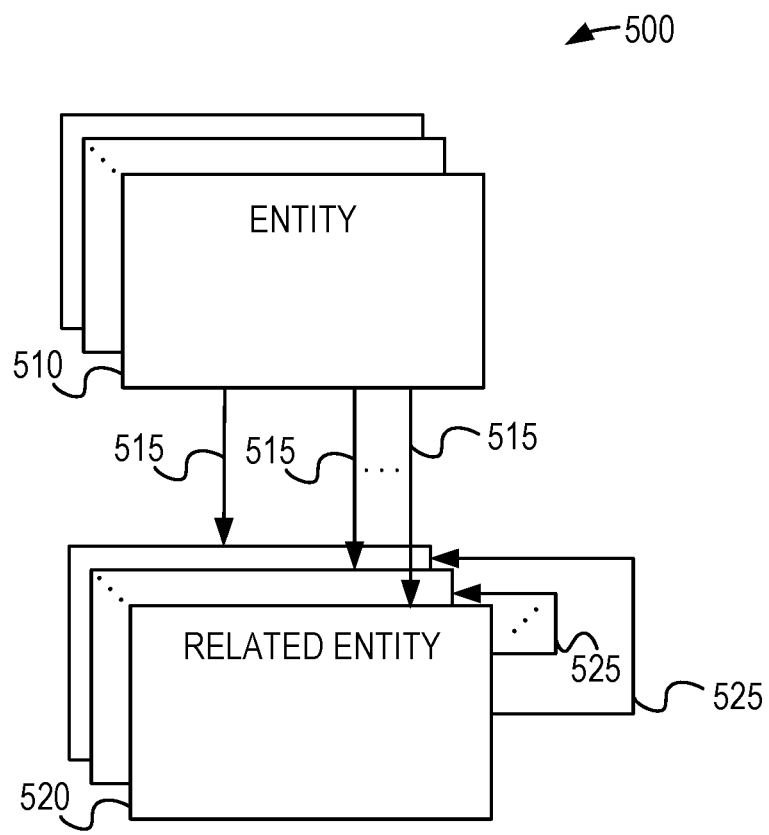
FIG. 5 shows a block diagram that illustrates a configuration graph showing relationships between entities and related entities in accordance with one or more embodiments.

FIG. 5 shows a block diagram that illustrates a configuration graph 500 showing relationships between entities 510 and related entities 520 in accordance with one or more embodiments. Each entity 510 may have a data retrieval relationship 515 with one or more related entities 520. Likewise, each related entity 520 may have a data retrieval relationship 525 with one or more other related entities 520. The configuration graph 500 may be stored in a configuration data file or in a data structure stored in memory.

Figure 6:
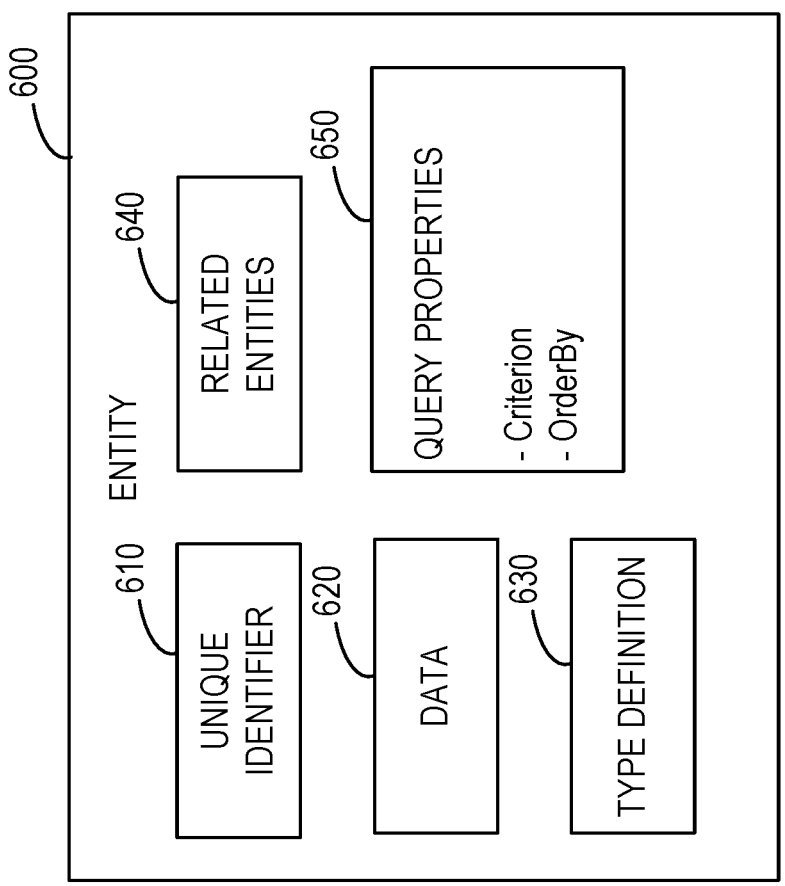
FIG. 6 shows a block diagram that illustrates components of an entity in a configuration graph in accordance with one or more embodiments.

FIG. 6 shows a block diagram that illustrates components of an entity 600 in a configuration graph in accordance with one or more embodiments. The entity 600 may be an embodiment of the entity 510 illustrated in FIG. 5. The entity 600 may include a unique identifier 610, data 620, a type definition 630, a pointer to one or more related entities 640, and various query properties 650. The unique identifier 610 may correspond to a unique identifier 215 of a persistence entity 210 corresponding to the entity 600 when the entity 600 is persisted in the client application 135 and/or client device 130. The data 620 may correspond to the data values 225 of the corresponding persistence entity 210, while the type definition 630 may correspond to the type definition 220 of the corresponding persistence entity 210.

The related entities 640 may include a list of unique identifiers 710 (see FIG. 7) associated with one or more related entities 700. The related entities 640 may be related to the entity 600 according to any of a number of different criteria that may be specified in query properties 650. The query properties 650 may also specify how related entities 640 should be ordered in a list of results when the related entities 640 are queried in the datastore 115 of the server 110.

Figure 7:
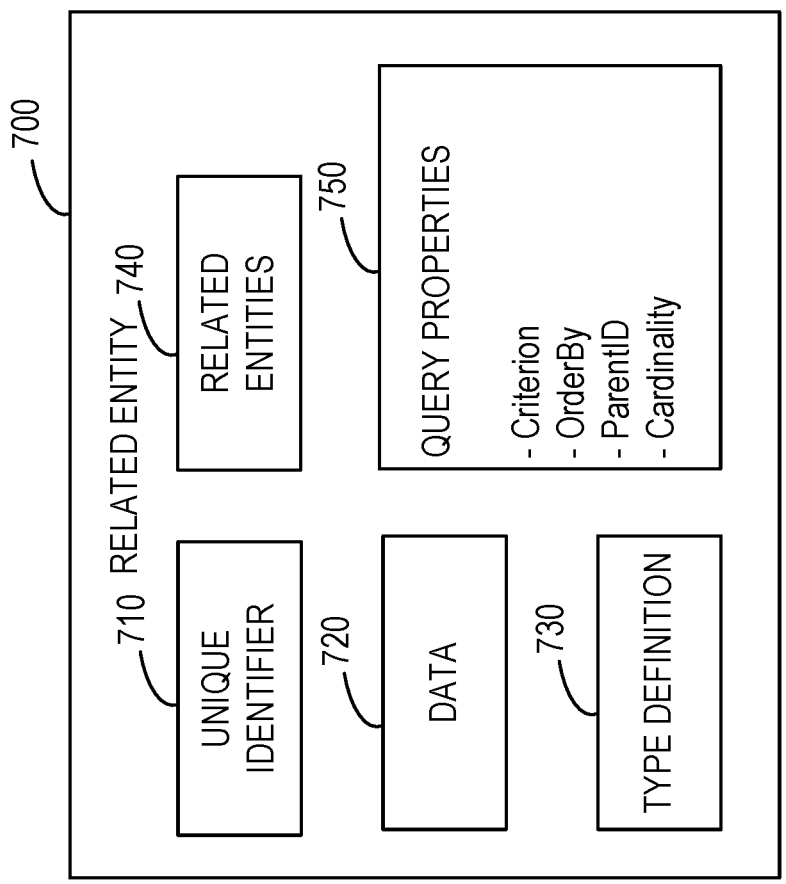
FIG. 7 shows a block diagram that illustrates components of a related entity in a configuration graph in accordance with one or more embodiments.

FIG. 7 shows a block diagram that illustrates components of a related entity 700 in a configuration graph in accordance with one or more embodiments. The related entity 700 may be an embodiment of the related entity 520 illustrated in FIG. 5. The related entity 700 may include a unique identifier 710, data 720, a type definition 730, a pointer to one or more other related entities 740, and various query properties 750. The unique identifier 710 may correspond to a unique identifier 215 of a persistence entity 210 corresponding to the related entity 700 when the related entity 700 is persisted in the client application 135 and/or client device 130. The data 720 may correspond to the data values 225 of the corresponding persistence entity 210, while the type definition 730 may correspond to the type definition 220 of the corresponding persistence entity 210.

The related entities 740 may include a list of unique identifiers 710 associated with one or more other related entities 700. The related entities 740 may be related to the related entity 700 according to any of a number of different criteria that may be specified in query properties 750. The query properties 750 may correspond to the results of a query performed on an entity 600 in order to return one or more related entities 640 according to the query properties 650 associated with the performed query. The query properties 750 may also specify how related entities 740 should be ordered in a list of results when the related entities 740 are queried in the datastore 115 of the server 110. The query properties 750 also include a ParentID or unique identifier 710 of an entity 600 that is associated with a related entity 700 as a parent, and a cardinality or a number of related entities 700 that match a given query criterion with the related entity 700.

Figure 8:
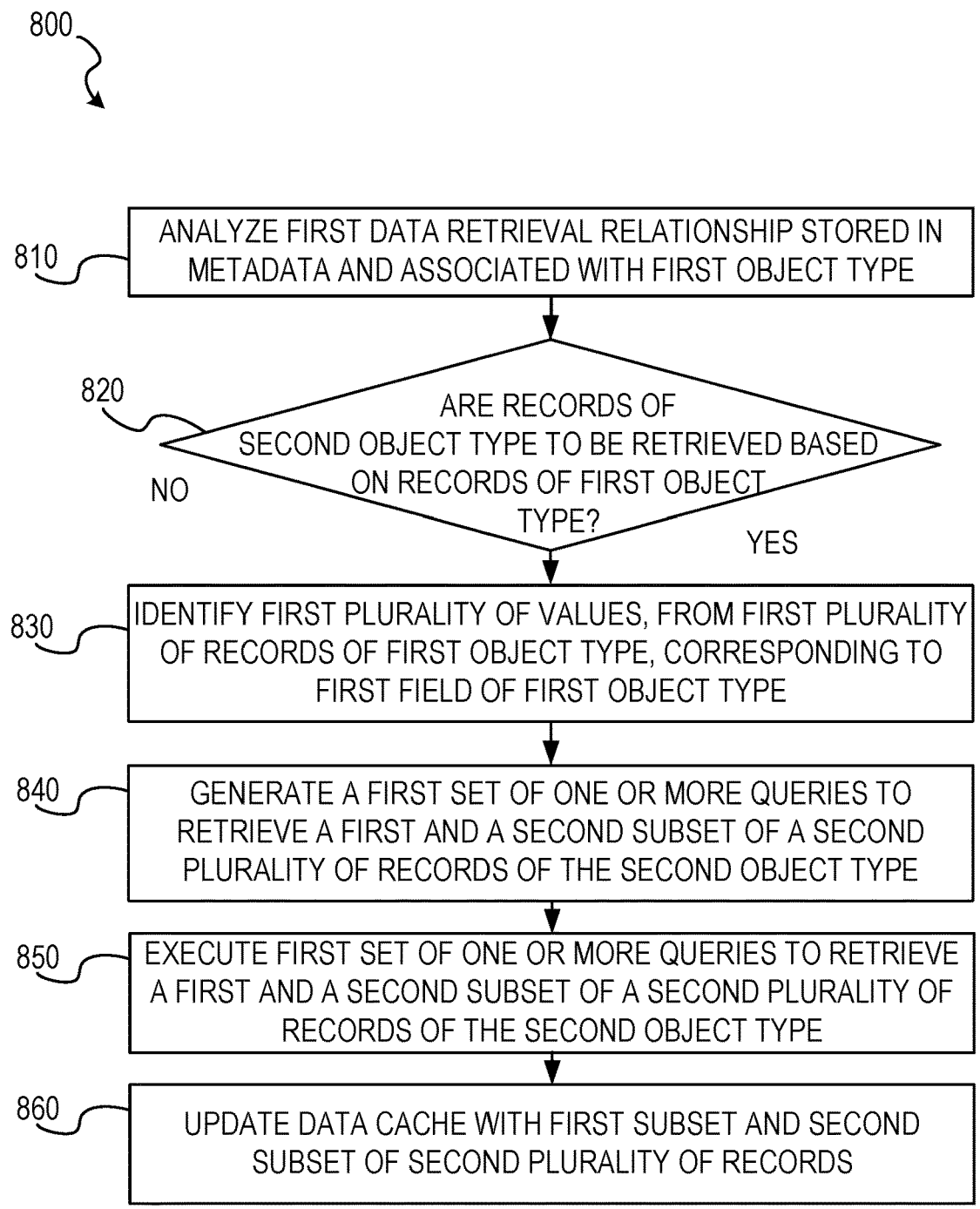
FIG. 8 shows a block diagram that illustrates an example set of operations for updating a data cache in accordance with one or more embodiments.

FIG. 8 shows a block diagram that illustrates an example set of operations 800 for updating a data cache in accordance with one or more embodiments. The set of operations 800 may be performed by the client application 135 on the client device 130 as illustrated in FIG. 1. One or more operations illustrated in FIG. 8 may be modified, rearranged, or omitted altogether. Accordingly, the particular sequence of operations illustrated in FIG. 8 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims. In various embodiments, the operations 800 may be performed using the systems and components described above with reference to FIGS. 1-9.

A configuration graph, e.g., a configuration graph 500, may be stored in a data file or in a data structure in memory. The configuration graph may define a subset of data to be retrieved from a datastore 115 and stored in a client device 130 by a client application 135. The client device 130 may include a much smaller amount of memory capacity than the datastore 115, and there may be a limited data bandwidth available in the network 120 to transmit the data from the datastore 115 to the client device 130. The data defined in the configuration graph (e.g., configuration graph 500) may include entities (e.g., entities 510) and related entities (e.g., related entities 520) that correspond to the persistence entities 210 discussed with reference to FIG. 2 herein. The configuration graph may also define features of the client application 135, e.g., queries to be executed on the data stored in the datastore 115 to retrieve data matching various defined criteria. The data and applications of the configuration graph may include information stored in metadata. Based on the metadata, the client application 135 may identify related entities 520, use a value of an entity 510 to generate a query for the related entities 520 identified in the metadata, and then retrieve the entities 510 and related entities 520 from the datastore 115.

As an example, an entity 510 in a configuration graph 500 may be associated with a first object type having a type definition 630 for an object type Product. The Product object type may be for one or more products offered by the company that a sales person using the client application 135 on the client device 130 is going on the road to sell. The configuration graph 500 may include a query in metadata with query properties 650 to search for and retrieve all second object types having a type definition 630 for an object type Opportunity in the datastore 115 that match the specified query properties 650 for the specified products offered by the sales person's company. The Opportunity object type may be for one or more sales opportunities for the specified products offered by the company. The sales opportunities may include information such as a contact person's name, phone number, address, telephone number, product(s) desired for purchase, expected number of units required, expected timeframe required for delivery, etc. The client application 135 may analyze the relationships between the specified products and associated sales opportunities as data retrieval relationships stored in metadata associated with a first object type (Operation 810). In this example, the first object type may be the Product object type.

After the client application 135 analyzes the data retrieval relationship, the client application 135 may determine whether there are any records to be retrieved from the datastore 115 based on the records of the first object type (Operation 820). According to the analysis of the Operation 810 in this example, the client application 135 may determine that there are sales opportunities to be retrieved from the datastore 115 based on the specified products offered by the company.

In the example being discussed, the client application 135 may begin to prepare to perform a query on the datastore 115 in order to retrieve all the sales opportunity records associated with the company's products that the sales person is going to need as the sales person goes on the road to make sales calls. As one step in those preparations, the client application 135 may identify a product name of each of the one or more products for which sales opportunities will be retrieved from the datastore 115. In other words, the client application 135 may identify one or more values from one or more records of the first object type, e.g., the Product object type, corresponding to the product name field of the first object type (Operation 830).

The client application 135 may then generate a set of one or more queries using the one or more product names of each of the one or more products for which sales opportunities will be retrieved from the datastore 115. These queries may be generated based on query properties 650 in the entities 600 corresponding to the products. A set of queries may be generated to retrieve related entities 640 related to a particular entity 600. There may be more than one set of queries generated, one for one product name and another for another product name, for example. In other words, the client application 135 may generate a set of one or more queries to retrieve a first and a second subset of a second set of records of the second object type (Operation 840). Generating the one or more queries may include generating one or more URI's representing the queries. The first and second subsets of the second set of records of the second object type may include the first and second values, respectively, in relation to the second field of the second object type. For example, the first and second subsets of the sales opportunities records may include the first and second product names, respectively, in relation to the product name fields of the corresponding subsets of sales opportunities. A set of queries may be generated to retrieve a first subset of sales opportunities for a first product name and a second subset of sales opportunities for a second product name from the datastore 115. The client application 135 may then execute the set of one or more queries to retrieve a first and second subset of a second set of records of the second object type (Operation 850).

Following execution of the queries, the client application 135 may store the retrieved data from the datastore 115 in the client device 130 by updating the cache in the client application 135 with the first and second subset of the second set of records of the second object type (Operation 860). For example, the client application 135 may locally store, in a data cache of the client device 130, the sales opportunities related to the products whose names were identified in the queries performed on the datastore 115.

An exemplary configuration graph 500 represented by records for products and related sales opportunities to be retrieved from the datastore 115 according to execution of queries on product names of the specified products in Operation 850 are shown in the following Table 1. The product records show the data stored in the datastore 115 to be accessed by the queries.

As illustrated in Table 1, the product records have a product name field value that matches a corresponding product name field in corresponding sales opportunity records. Queries for sales opportunity records related to specific products may search for product name fields having a specific product name value that matches the product name value of the specific products to which the sales opportunity records are related. A relationship between a product and a sales opportunity, for example, may be established whenever a potential customer expresses an interest in a product and that interest is captured in the datastore 115 as an entry in the relevant sales opportunity record associated with the customer. The interest may be captured by a sales person, a website form, data entry from a handwritten information card, etc.

TABLE 1

Exemplary configuration graph 500 represented product records with statically linked related sales opportunity records.

| | |
|---|---|
| Unique Identifier | Product1 |
| Product Name | ProductOne |
| Product Data | . . . |
| Unique Identifier | Product2 |
| Product Name | ProductTwo |
| Product Data | . . . |
| Unique Identifier | Product3 |
| Product Name | ProductThree |
| Product Data | . . . |
| Unique Identifier | Opportunity1 |
| Contact Name | Joe |
| Product Name | ProductOne |
| Contact Data | . . . |
| Unique Identifier | Opportunity2 |
| Contact Name | John |
| Product Name | ProductOne |
| Contact Data | . . . |
| Unique Identifier | Opportunity3 |
| Contact Name | Joe |
| Product Name | ProductTwo |
| Contact Data | . . . |
| Unique Identifier | Opportunity4 |
| Contact Name | John |
| Product Name | ProductTwo |
| Contact Data | . . . |
| Unique Identifier | Opportunity5 |
| Contact Name | Jane |
| Product Name | ProductThree |
| Contact Data | . . . |
| Unique Identifier | Opportunity6 |
| Contact Name | Sally |
| Product Name | ProductThree |
| Contact Data | . . . |
| Unique Identifier | Opportunity7 |
| Contact Name | John |
| Product Name | ProductThree |
| Contact Data | . . . |
| Unique Identifier | Opportunity8 |
| Contact Name | Joe |
| Product Name | ProductThree |
| Contact Data | . . . |

A similar example of a configuration graph 500 including records for products and related sales opportunities to be retrieved from the datastore 115 according to execution of queries on product names of the specified products in Operation 850 are shown in the following Table 2, except that the product records are stored using dynamically linked relationships between related entities. As opposed to the statically linked relationships shown in Table 1 where the relationships are identified by names of fields that are shared between entities and related entities, the dynamically linked relationships of Table 2 are established by dynamic link data structures between the entities and related entities. When the relationships change, the client application 135 may modify the links in the data structures of the data cache on board the client device 130. The client application 135 may execute the configuration graph 500 to update a data cache on board the client device 130 from the data stored on the datastore 115, as well.

TABLE 2

Exemplary configuration graph 500 including product records with dynamically-linked related sales opportunity records.

| | |
|---|---|
| Unique Identifier | Product1 |
| Product Name | ProductOne |
| Sales Opportunities Pointers | . . . |
| Product Data | . . . |
| Unique Identifier | Product2 |
| Product Name | ProductTwo |
| Sales Opportunities Pointers | . . . |
| Product Data | . . . |
| Unique Identifier | Product3 |
| Product Name | ProductThree |
| Sales Opportunities Pointers | . . . |
| Product Data | . . . |
| Unique Identifier | Opportunity1 |
| Contact Name | Joe |
| Product Pointers | → ProductOne |
| Contact Data | . . . |
| Unique Identifier | Opportunity2 |
| Contact Name | John |
| Product Pointers | → ProductOne |
| Contact Data | . . . |
| Unique Identifier | Opportunity3 |
| Contact Name | Joe |
| Product Pointers | → ProductTwo |
| Contact Data | . . . |
| Unique Identifier | Opportunity4 |
| Contact Name | John |
| Product Pointers | → ProductTwo |
| Contact Data | . . . |
| Unique Identifier | Opportunity5 |
| Contact Name | Jane |
| Product Pointers | → ProductThree |
| Contact Data | . . . |
| Unique Identifier | Opportunity6 |
| Contact Name | Sally |
| Product Pointers | → ProductThree |
| Contact Data | . . . |
| Unique Identifier | Opportunity7 |
| Contact Name | John |
| Product Pointers | → ProductThree |
| Contact Data | . . . |
| Unique Identifier | Opportunity8 |
| Contact Name | Joe |
| Product Pointers | → ProductThree |
| Contact Data | . . . |

In an embodiment, a configuration graph 500 may have all the sales opportunities for a geographic region that a sales person is going to be visiting on a sales trip related to products that the sales person is selling. The configuration graph 500 may update the client device 130 with the information needed by the sales person for the upcoming sales trip automatically without the sales person needing to do so manually. The sales person may load a data file including the configuration graph 500 into the client application 135 before the sales trip in order to automatically update the data cache of the client device 130 before the sales person's sales trip.

In various embodiments, a configuration graph 500 may facilitate data stored locally on a client device 130 to be automatically updated prior to being anticipated as being needed. By doing so, problems with slow or unavailable access to a datastore 115 by the client application 135 when the data is needed may be avoided.

In various embodiments, the configuration graph 500 is stored in memory in the client application 135, so that each time the sales person signs into the client application 135, the configuration graph 500 is traversed and the data cache of the client device 130 is updated according to the current data stored in the datastore 115 before the sales person begins using the client application 135.

In various embodiments, whenever a persistence entity 210 corresponding to an entity 510 in a configuration graph 500 is updated in the client application 135, the configuration graph 500 may be traversed to refresh or update any entities 600 and/or related entities 640 affected by the update to the persistence entity 210 with data downloaded from the datastore 115.

The configuration graph 500 facilitates efficient updates of data persisting on the client device 130 from data downloaded from the datastore 115. This is important and useful, considering that the client device 130 includes a significantly smaller amount of memory and storage space for data than the datastore 115, and that the network 120 between the client device 130 and the server 110 that hosts the datastore 115 has limited bandwidth and is sometimes unavailable.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between the overlay nodes as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
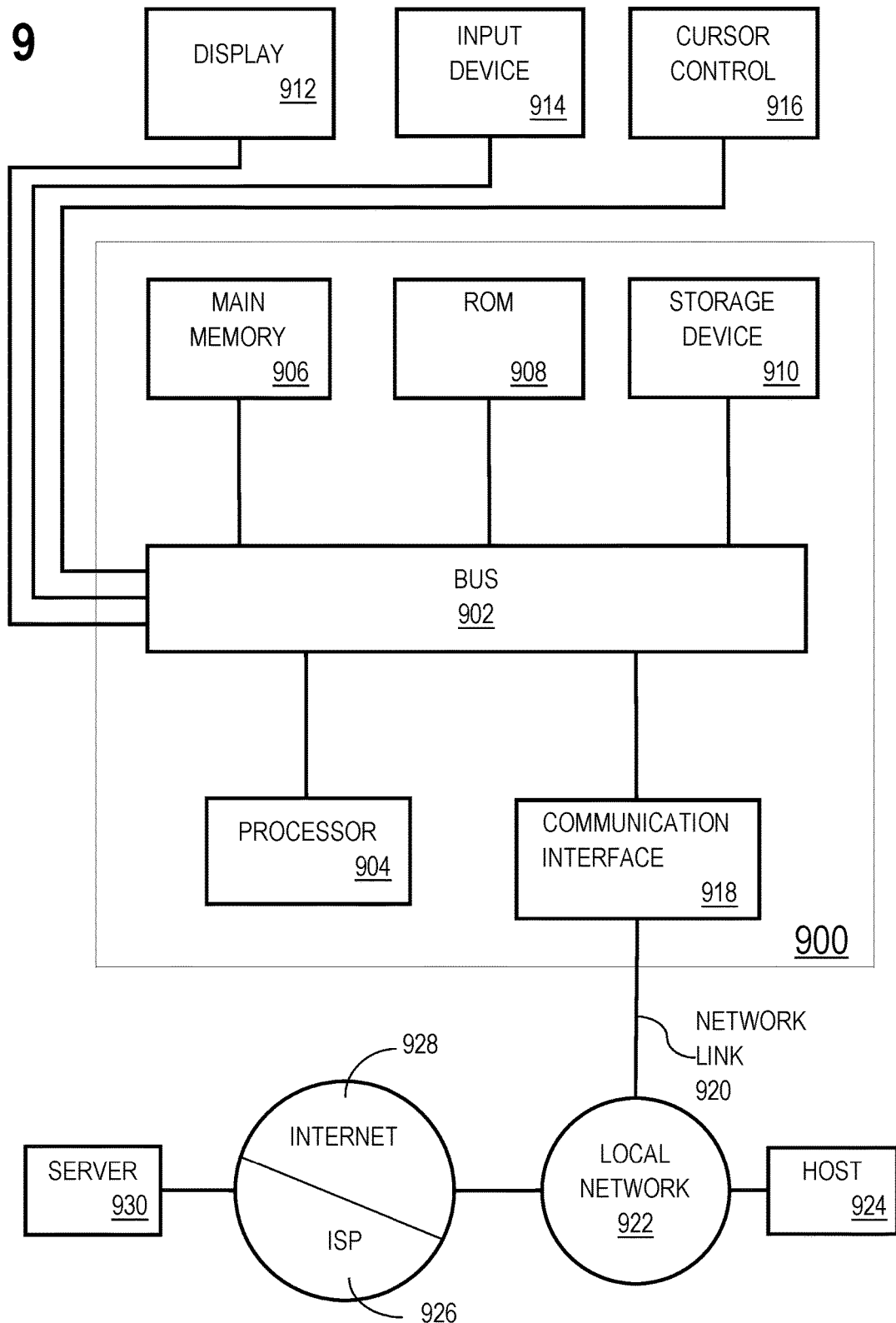
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into the remote computer's dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as the code is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
updating a data cache based on a first object type at least by:
identifying a first data retrieval relationship stored in metadata and associated with the first object type;
analyzing the first data retrieval relationship to determine that records of a second object type are to be retrieved for updating the data cache based on records of the first object type;
identifying a first plurality of values, from a respective first plurality of records of the first object type, corresponding to a first field of the first object type,
wherein the first plurality of values comprise a first value and a second value;
generating a first set of one or more queries to retrieve:
(a) a first subset, of a second plurality of records of the second object type, that include the first value in relation to a second field of the second object type;
(b) a second subset, of the second plurality of records of the second object type, that include the second value in relation to the second field of the second object type;
executing the first set of one or more queries to retrieve the first subset and the second subset of the second plurality of records;
updating the data cache with the first subset and the second subset of the second plurality of records;
responsive to updating the data cache with the first subset and the second subset of the second plurality of records of the second object type, recursively updating the data cache based on the second object type at least by:
identifying a second data retrieval relationship stored in metadata and associated with the second object type;
analyzing the second data retrieval relationship to determine that records of a third object type are to be retrieved for updating the data cache based on records of the second object type;
identifying a second plurality of values, from the first subset and second subset of the second plurality of records of the second object type,
wherein the second plurality of values comprise a third value and a fourth value;
generating a second set of one or more queries to retrieve:
(a) a first subset, of a third plurality of records of the third object type, that include the third value in relation to a third field of the third object type;
(b) a second subset, of the third plurality of records of the third object type, that include the fourth value in relation to the third field of the third object type;
executing the second set of one or more queries to retrieve the first subset and the second subset of the third plurality of records; and
updating the data cache with the first subset and the second subset of the third plurality of records.

2. The one or more non-transitory machine-readable media of claim 1, wherein the operations further comprise:
prior to identifying the first plurality of values:
executing a query for all records of the first object type to retrieve the first plurality of records of the first object type.

3. The one or more non-transitory machine-readable media of claim 2, wherein retrieving the first plurality of records is agnostic regarding the first object type.

4. The one or more non-transitory machine-readable media of claim 1, wherein the one or more queries are agnostic regarding the second object type.

5. The one or more non-transitory machine-readable media of claim 1, wherein the one or more queries are based on metadata relating the second object type to the first object type.

6. The one or more non-transitory machine-readable media of claim 1, wherein retrieving the first subset and the second subset of the second plurality of records are performed prior to a request for a record of the second plurality of records by a user.

7. The one or more non-transitory machine-readable media of claim 1, wherein retrieving the first subset and the second subset of the second plurality of records includes specifying a uniform resource locator (URL) to access at least one of the first plurality of records from a datastore.

8. The one or more non-transitory machine-readable media of claim 1, further storing instructions which, when executed by one or more processors, cause:
creating second persistence entities to represent each of the second plurality of records.

9. The one or more non-transitory machine-readable media of claim 8, wherein:
each of the first plurality of records are represented by first persistence entities; and
a same set of executable instructions processes the first plurality of records according to the first persistence entities as processes the second plurality of records according to the second persistence entities.

10. The one or more non-transitory machine-readable media of claim 1, wherein the first subset, of the second plurality of records of the second object type, is statically linked to the first plurality of records of the first object type.

11. The one or more non-transitory machine-readable media of claim 1, wherein the first subset, of the second plurality of records of the second object type, is dynamically linked to the first plurality of records of the first object type.

12. A method of recursive data traversal comprising:
updating a data cache based on a first object type at least by:
identifying a first data retrieval relationship stored in metadata and associated with the first object type;
analyzing the first data retrieval relationship to determine that records of a second object type are to be retrieved for updating the data cache based on records of the first object type;
identifying a first plurality of values, from a respective first plurality of records of the first object type, corresponding to a first field of the first object type,
wherein the first plurality of values comprise a first value and a second value;
generating a first set of one or more queries to retrieve:
(a) a first subset, of a second plurality of records of the second object type, that include the first value in relation to a second field of the second object type;
(b) a second subset, of the second plurality of records of the second object type, that include the second value in relation to the second field of the second object type;

executing the first set of one or more queries to retrieve the first subset and the second subset of the second plurality of records;

updating the data cache with the first subset and the second subset of the second plurality of records;

responsive to updating the data cache with the first subset and the second subset of the second plurality of records of the second object type, recursively updating the data cache based on the second object type at least by:

identifying a second data retrieval relationship stored in metadata and associated with the second object type;

analyzing the second data retrieval relationship to determine that records of a third object type are to be retrieved for updating the data cache based on records of the second object type;

identifying a second plurality of values, from the first subset and second subset of the second plurality of records of the second object type, wherein the second plurality of values comprise a third value and a fourth value;

generating a second set of one or more queries to retrieve:

(a) a first subset, of a third plurality of records of the third object type, that include the third value in relation to a third field of the third object type;

(b) a second subset, of the third plurality of records of the third object type, that include the fourth value in relation to the third field of the third object type;

executing the second set of one or more queries to retrieve the first subset and the second subset of the third plurality of records; and updating the data cache with the first subset and the second subset of the third plurality of records.

13. The method of claim 12, further comprising:
prior to identifying the first plurality of values:
executing a query for all records of the first object type to retrieve the first plurality of records of the first object type.

14. The method of claim 13, wherein retrieving the first plurality of records is agnostic regarding the first object type.

15. The method of claim 12, wherein the one or more queries are agnostic regarding the second object type.

16. The method of claim 12, wherein the one or more queries are based on metadata relating the second object type to the first object type.

17. The method of claim 12, wherein retrieving the first subset and the second subset of the second plurality of records are performed prior to a request for a record of the second plurality of records by a user.

18. The method of claim 12, further comprising:
creating second persistence entities to represent each of the second plurality of records;
wherein:
each of the first plurality of records are represented by first persistence entities; and
a same set of executable instructions processes the first plurality of records according to the first persistence entities as processes the second plurality of records according to the second persistence entities.

* * * * *